United States Patent
Niitsuma et al.

(10) Patent No.: US 9,826,725 B2
(45) Date of Patent: Nov. 28, 2017

(54) LEVEL WINDING MECHANISM FOR DUAL-BEARING REEL

(71) Applicant: Shimano Inc., Sakai, Osaka (JP)

(72) Inventors: Akira Niitsuma, Osaka (JP); Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 351 days.

(21) Appl. No.: 14/560,631

(22) Filed: Dec. 4, 2014

(65) Prior Publication Data

US 2015/0208631 A1    Jul. 30, 2015

(30) Foreign Application Priority Data

Jan. 28, 2014 (JP) ................................ 2014-013116

(51) Int. Cl.
*A01K 89/01*    (2006.01)
*A01K 89/015*    (2006.01)

(52) U.S. Cl.
CPC ...... *A01K 89/015* (2013.01); *A01K 89/01917* (2015.05)

(58) Field of Classification Search
CPC ............... A01K 89/01; A01K 89/0114; A01K 89/01141; A01K 89/01142; A01K 89/01143; A01K 89/015; A01K 89/01915; A01K 89/01916; A01K 89/01917
See application file for complete search history.

(56) References Cited

U.S. PATENT DOCUMENTS

| | | | | |
|---|---|---|---|---|
| 2,314,032 A | * | 3/1943 | Coxe | A01K 89/015 192/41 R |
| 2,366,920 A | * | 1/1945 | McMahon | A01K 89/015 242/306 |
| 3,447,760 A | * | 6/1969 | Sarah | A01K 89/015 242/279 |
| 4,974,792 A | * | 12/1990 | Miyazaki | A01K 89/015 242/279 |
| 5,131,596 A | * | 7/1992 | Sato | A01K 89/015 242/279 |
| 5,775,614 A | * | 7/1998 | Yamaguchi | A01K 89/015 242/261 |
| 6,003,801 A | * | 12/1999 | Kobayashi | A01K 89/015 242/310 |

(Continued)

FOREIGN PATENT DOCUMENTS

JP    2000-279070 A    10/2000
JP    2013-243997 A    12/2013

OTHER PUBLICATIONS

Japanese Office Action of corresponding Japanese patent Application No. 2014-013116 dated Sep. 19, 2017.

*Primary Examiner* — Emmanuel M Marcelo
(74) *Attorney, Agent, or Firm* — Global IP Counselors, LLP

(57) ABSTRACT

A level winding mechanism for a dual-bearing reel includes a worm shaft, a guide member and a slide member. The guide member has a tubular shape and is disposed radially outside of the worm shaft. The slide member has a first through hole and an accommodation recess. The first through hole enables the guide member to penetrate therethrough. The accommodation recess is formed on the inner surface of the first through hole. The slide member is configured to slide along the guide member.

16 Claims, 5 Drawing Sheets

(56) References Cited

U.S. PATENT DOCUMENTS

| | | | | |
|---|---|---|---|---|
| 6,045,075 A * | 4/2000 | Iwabuchi | ............ | A01K 89/015 242/157 R |
| 6,053,444 A * | 4/2000 | Yamaguchi | .......... | A01K 89/015 242/275 |
| 2003/0197081 A1 * | 10/2003 | Chin | .................. | A01K 89/0114 242/242 |
| 2004/0144877 A1 * | 7/2004 | Kawasaki | ............ | A01K 89/015 242/278 |
| 2005/0224617 A1 * | 10/2005 | Nakagawa | ........... | A01K 89/015 242/310 |
| 2015/0201597 A1 * | 7/2015 | Ikebukuro | ........ | A01K 89/01143 242/274 |

* cited by examiner

LEVEL WINDING MECHANISM FOR DUAL-BEARING REEL

CROSS-REFERENCE TO RELATED APPLICATIONS

This application claims priority to Japanese Patent Application No. 2014-013116, filed on Jan. 28, 2014, the entirety of which is hereby incorporated by reference in its entirety.

BACKGROUND

1. Field of the Invention

The present invention relates to a level winding mechanism for a dual-bearing reel.

2. Background Information

As described in Japan Laid-open Patent Application Publication No. JP-A-2013-243997, a dual-bearing reel includes a level winding mechanism for evenly winding a fishing line onto a spool. The level winding mechanism includes a worm shaft, a guide member and a slide member. The guide member has a tubular shape, and the worm shaft extends through the inside of the guide member. When the worm shaft is rotated, the slide member is reciprocated along the guide member. The slide member has a through hole enabling the guide member to penetrate therethrough.

A small clearance is preferably produced between the inner peripheral surface of the through hole of the slide member and the outer peripheral surface of the guide member in order to enable smooth reciprocation of the slide member along the guide member. However, such a small clearance results in drawbacks as follows. When a minute foreign object (e.g., mud) attaching to the outer peripheral surface of the guide member gets stuck in the clearance, the stuck object prevents smooth reciprocation of the slide member along the guide member and scratches the outer peripheral surface of the guide member.

SUMMARY

It is an object of the present invention to smoothly reciprocate a slide member along a guide member in a dual-bearing reel.

A level winding mechanism for a dual-bearing reel according an aspect of the present invention includes a worm shaft, a guide member and a slide member. The guide member has a tubular shape and is disposed radially outside of the worm shaft. The slide member is configured to be slid along the guide member. The slide member has a first through hole and an accommodation recess. The guide member passes through the first through hole. The accommodation recess is formed on an inner surface of the first through hole.

According to this structure, even when a foreign object (e.g., mud) enters the first through hole through a clearance produced between the guide member and the first through hole of the slide member, the foreign object is trapped within the accommodation recess formed on the inner surface of the first through hole. Thus, even when such a foreign object enters the first through hole, the slide member can be smoothly reciprocated along the guide member.

Preferably, the guide member includes a guide member body and an opening. The guide member body has a tubular shape. The opening is bored in the guide member body. Further the opening extends in a longitudinal direction of the guide member body. According to this structure, a foreign object trapped within the accommodation recess can be discharged through the opening.

Preferably, the accommodation recess is opposed to the guide member body and the opening. According to this structure, a foreign object trapped within the accommodation recess can be efficiently discharged through the opening.

Preferably, the opening is oriented downwardly in the a dual-bearing reel. According to this structure, a foreign object can be more efficiently discharged.

Preferably, the accommodation recess extends in a circumferential direction of the inner surface of the first through hole. According to this structure, when entering the first through hole, a foreign object can be efficiently trapped within the accommodation recess.

Preferably, the level winding mechanism further includes an engaging member that is engaged with the worm shaft. Preferably, the slide member further has a second through hole for accommodating the engaging member.

Preferably, the engaging member is engaged with the worm shaft through the opening.

Preferably, the accommodation recess extends in the circumferential direction of the inner surface of the first through hole. Preferably, the accommodation recess communicates with the second through hole.

Preferably, the level winding mechanism further includes a lid member. The lid member has a retaining part and a lid body. The retaining part is accommodated within the second through hole and retains the engaging member. The lid body covers an end of the second through hole. According to this structure, the engaging member can be retained by the retaining part in a position close to the worm shaft as much as possible. As a result, wobbling of the engaging member can be prohibited.

Preferably, the retaining part is partially accommodated in the opening.

Preferably, the retaining part has a tubular shape and is disposed between the inner peripheral surface of the first through hole and the outer peripheral surface of the engaging member.

Preferably, the second through hole has a female threaded part on the inner peripheral surface thereof. Preferably, the retaining part has a male threaded part on the outer peripheral surface thereof. The male threaded part is screwed into the female threaded part.

Preferably, the slide member has a fishing line guide part for guiding a fishing line.

Overall, according to the present invention, it is possible to smoothly reciprocate the slide member along the guide member.

BRIEF DESCRIPTION OF THE DRAWINGS

Referring now to the attached drawings which form a part of this original disclosure.

DETAILED DESCRIPTION OF EMBODIMENTS

Figure 1:
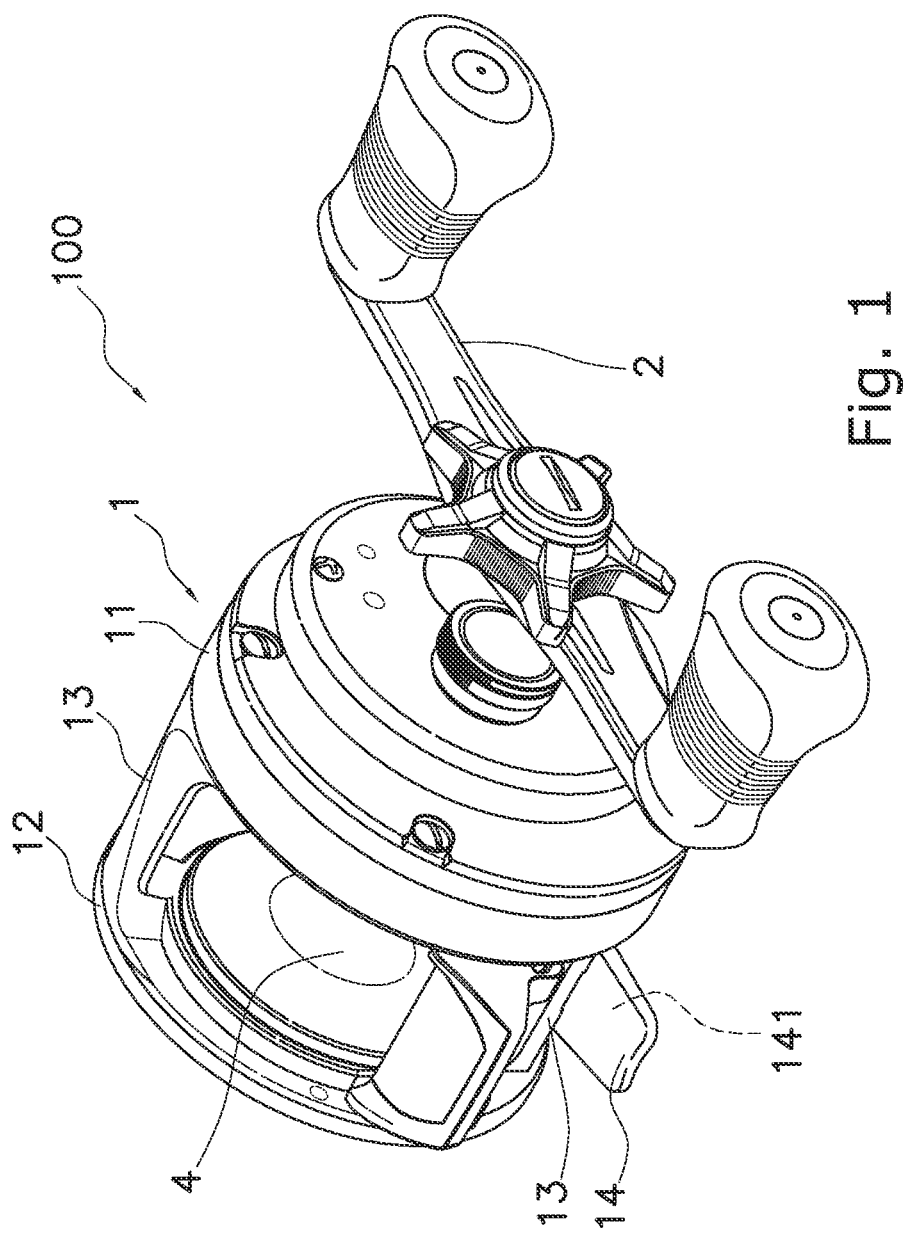
FIG. 1 is a perspective view of a dual-bearing reel.

With reference to the attached drawings, explanation will be hereinafter made of a level winding mechanism according to an exemplary embodiment of the present invention. FIG. 1 is a perspective view of a dual-bearing reel equipped with a level winding mechanism, whereas FIG. 2 is a cross-sectional view of the dual-bearing reel.

Figure 2:
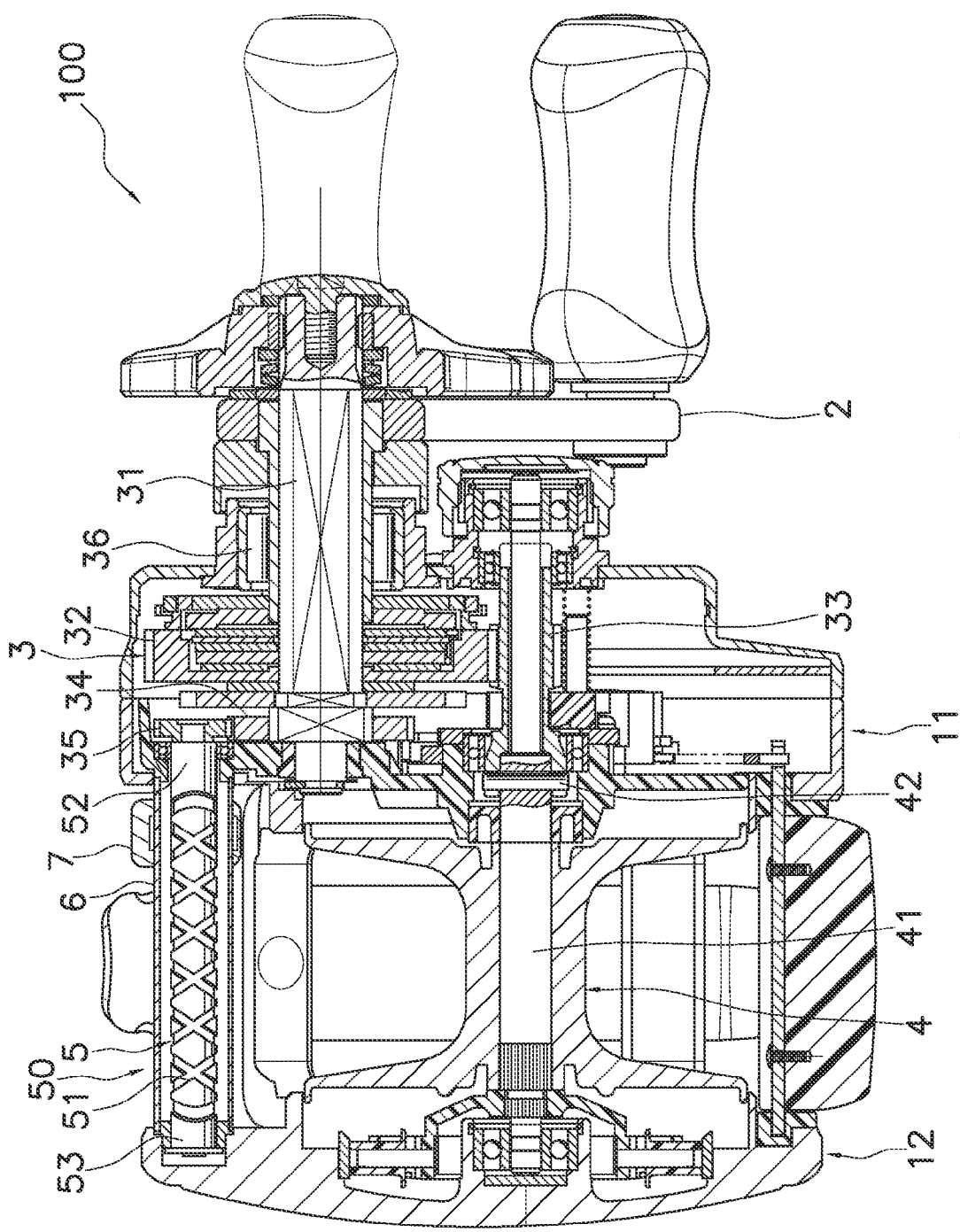
FIG. 2 is a cross-sectional view of the dual-bearing reel.

As illustrated in FIGS. 1 and 2, a dual-bearing reel 100 according to the present exemplary embodiment is configured to reel out a fishing line in a forward direction (in the up-right direction in FIG. 1). The dual-bearing reel 100 includes a reel body 1, a handle 2, a rotation transmission mechanism 3, a spool 4 and a level winding mechanism 50.

As illustrated in FIG. 1, the reel body 1 has a first body part 11, a second body part 12, a plurality of coupling parts 13 and an attachment part 14. The first body part 11 and the second body part 12 face each other. As illustrated in FIG. 2, a spool shaft 41 is supported by the first body part 11 and the second body part 12.

As illustrated in FIG. 1, the coupling parts 13 couple the first body part 11 and the second body part 12. The attachment part 14 extends in the back-and-forth direction, and is designed to be attached to a fishing rod. The attachment part 14 has an attachment surface 141. The attachment surface 141 is configured to make contact with the fishing rod when the attachment part 14 is attached to the fishing rod. In FIG. 1, the attachment surface 141 is face down. At least one of the coupling parts 13 is fixed to the attachment part 14.

As illustrated in FIG. 2, the handle 2 is rotatably mounted to the outer lateral surface of the first body part 11. When a rotational operation is performed on the handle 2, the spool 4 and the level winding mechanism 50 are configured to be driven through the rotation transmission mechanism 3.

The rotation transmission mechanism 3 is a mechanism configured to transmit rotation of the handle 2 to the spool 4 and the level winding mechanism 50. The rotation transmission mechanism 3 is installed within the first body part 11. The rotation transmission mechanism 3 includes a drive shaft 31, a drive gear 32, a pinion gear 33, a first gear 34 and a second gear 35.

The drive shaft 31 is coupled to the handle 2, and is configured to be unitarily rotated with the handle 2. It should be noted that a one-way clutch 36 prevents the drive shaft 31 from rotating in a fishing line releasing direction. The drive gear 32 is mounted onto the drive shaft 31, and is unitarily rotated with the drive shaft 31. The pinion gear 33 is meshed with the drive gear 32. It should be noted that the pinion gear 33 has a tubular shape. The first gear 34 is mounted onto the drive shaft 31, and is unitarily rotated with the drive shaft 31. The second gear 35 is meshed with the first gear 34.

The spool 4 is disposed between the first body part 11 and the second body part 12. The fishing line is wound onto the outer peripheral surface of the spool 4. The spool 4 is fixed to the spool shaft 41, and is unitarily rotated with the spool shaft 41.

The spool shaft 41 is rotatably supported by the first body part 11 and the second body part 12 through beating members. One end of the spool shaft 41, disposed on the same side as the first body part 11, penetrates through the inside of the pinion gear 33. The spool shaft 41 is engaged with the pinion gear 33 through a clutch mechanism. When the clutch mechanism is set in a clutch-on state, the spool shaft 41 and the pinion gear 33 are engaged with each other and are capable of being unitarily rotated. Contrarily, when the clutch mechanism is set in a clutch-off state, the spool shaft 41 and the pinion gear 33 are disengaged from each other and are capable of being rotated relatively to and independently from each other. When described in detail, the pinion gear 33 is engaged with or disengaged from the spool shaft 41 through an engaging pin 42 penetrating through the spool shaft 41. When moved to the left in FIG. 2, the pinion gear 33 is engaged with the engaging pin 42. Contrarily, when moved to the right in FIG. 2, the pinion gear 33 is disengaged from the engaging pin 42.

Figure 3:
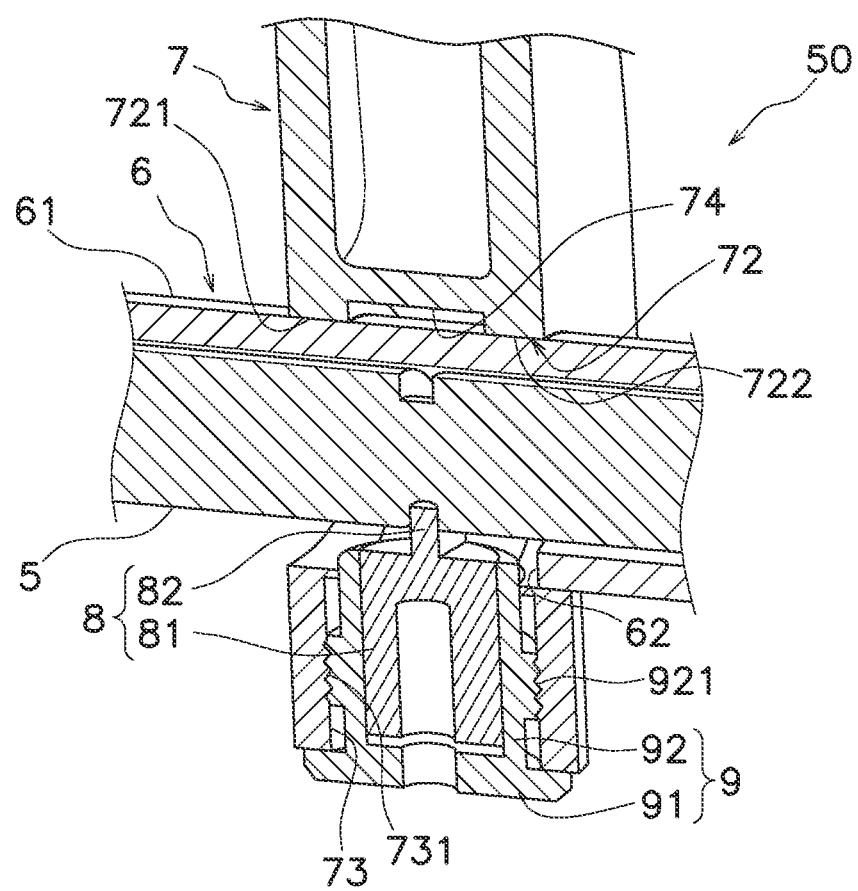
FIG. 3 is a cross-sectional view of a level winding mechanism.

FIG. 3 is a cross-sectional view of the level winding mechanism 50. The level winding mechanism 50 is configured to be reciprocated so as to evenly wind the fishing line about the spool 4. As illustrated in FIG. 3, the level winding mechanism 50 includes a worm shaft 5, a guide member 6 and a slide member 7. Further, the level winding mechanism 50 includes an engaging member 8 and a lid member 9.

As illustrated in FIG. 2, the worm shaft 5 has a columnar shape and has a helical groove 51 on the outer peripheral surface thereof. The worm shaft 5 extends substantially in parallel to the spool shaft 41. Further, the worm shaft 5 extends between the first body part 11 and the second body part 12.

A first end part 52 of the worm shaft 5 is rotatably supported by the first body part 11. The first end part 52 of the worm shaft 5 may be supported by the first body part 11 through a bearing member. A second end 53 of the worm shaft 5 is rotatably supported by the second body part 12. The second end part 53 of the worm shaft 5 may be supported by the second body part 12 through a bearing member.

The aforementioned second gear 35 is mounted onto the first end part 52 of the worm shaft 5. The worm shaft 5 is unitarily rotatable with the second gear 35. The worm shaft 5 is rotated in conjunction with rotation of the handle 2. When described in detail, the second gear 35 is rotated through the drive shaft 31 and the first gear 34 in conjunction with rotation of the handle 2. As a result, the worm shaft 5 is rotated.

The guide member 6 is a member for guiding the slide member 7. The guide member 6 has a cylindrical shape and is disposed radially outside of the worm shaft 5. The guide member 6 extends substantially in parallel to the worm shaft 5. Further, the guide member 6 extends between the first body part 11 and the second body part 12. A first end part of the guide member 6 is non-rotatably supported by the first body part 11. A second end part of the guide member 6 is non-rotatable supported by the second body part 12.

When described in detail, the guide member 6 has a guide member body 61 and an opening 62 as illustrated in FIG. 3. The guide member body 61 has a tubular shape and is disposed radially outside of the worm shaft 5. The longitudinal direction of the guide member body 61 is substantially the same as the extending direction of the worm shaft 5.

The guide member body 61 has the opening 62. The opening 62 enables the engaging member 8 to be engaged with the worm shaft 5. The opening 62 is formed along the longitudinal direction of the guide member body 61. In other words, the opening 62 is formed along the worm shaft 5. The opening 62 is oriented downwardly in the dual-bearing reel 100. In other words, the opening 62 is oriented in substantially the same direction as the attachment surface 141 of the attachment part 14.

As illustrated in FIG. 3, the slide member 7 is configured to be slid along the guide member 6. When described in detail, the slide member 7 is reciprocated along the guide member 6.

Figure 4:
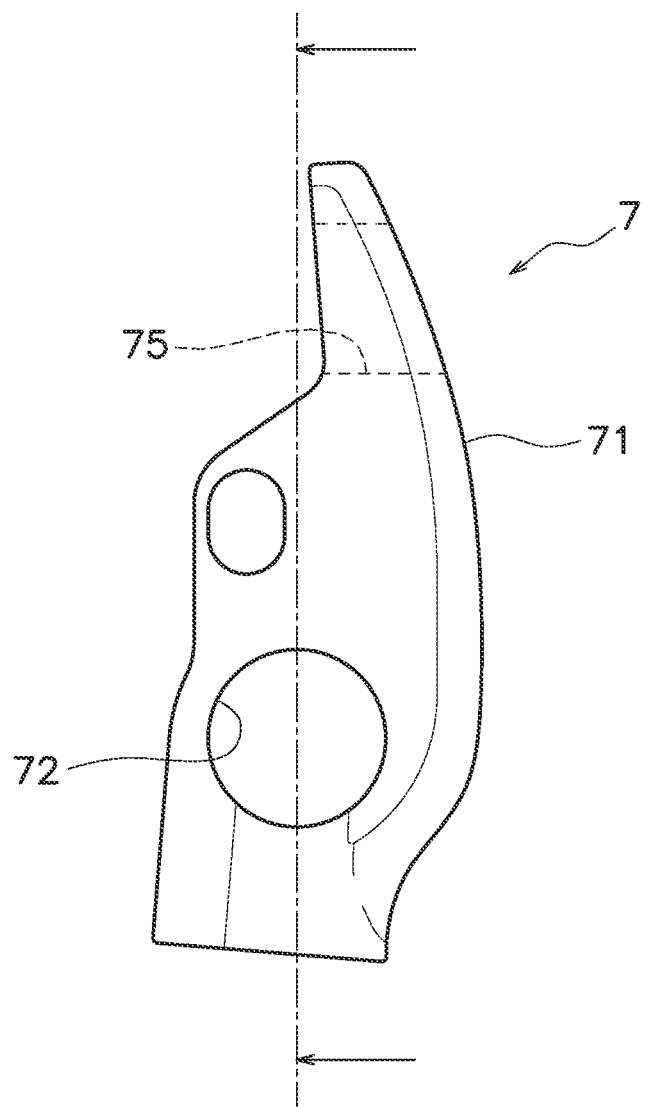
FIG. 4 is a side view of a slide member.
Figure 5:
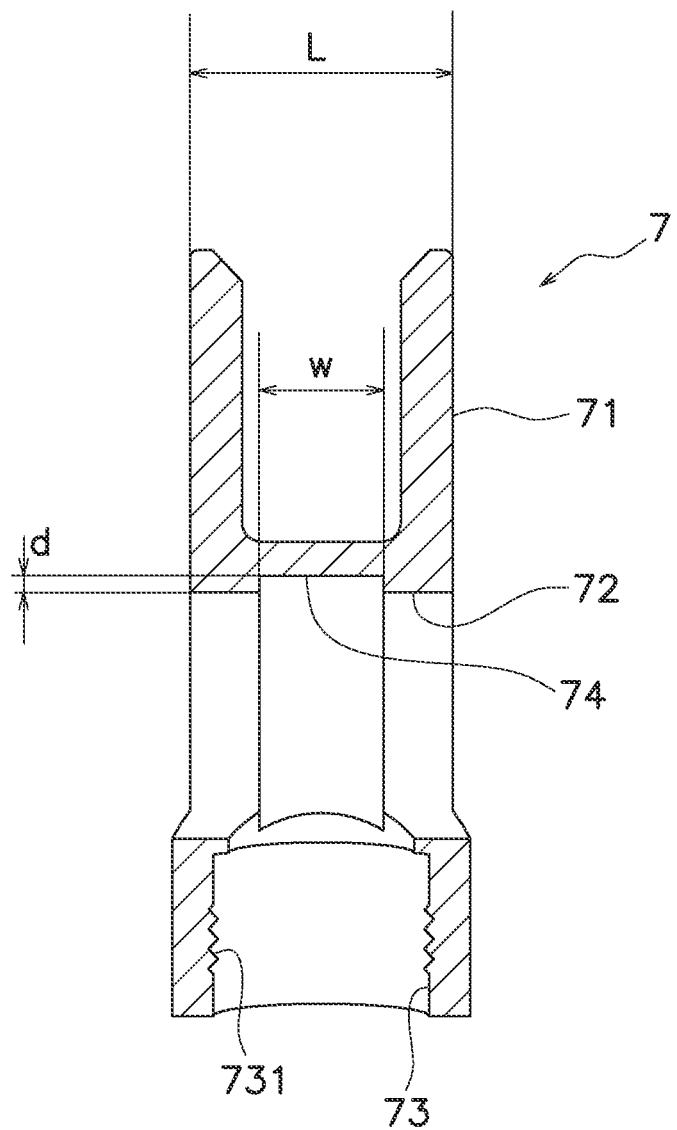
FIG. 5 is a cross-sectional view of FIG. 4 taken along a line A-A.

FIG. 4 is a side view of the slide member 7, whereas FIG. 5 is a cross-sectional view of FIG. 4 taken along a line A-A. As illustrated in FIGS. 4 and 5, the slide member 7 has a slide member body 71, a first through hole 72, a second through hole 73 and an accommodation recess 74. The slide member body 71 slides along the guide member 6.

The first through hole 72 is a hole penetrating through the slide member body 71, and extends along the guide member 6. The guide member 6 penetrates through the first through hole 72. A slight clearance of roughly 0.01 mm to 0.12 mm is produced between the inner peripheral surface of the first through hole 72 and the outer peripheral surface of the guide member 6. It should be noted that the first through hole 72 has a circular cross-section.

The second through hole 73 is a hole for accommodating the engaging member 8. The second through hole 73 has a circular cross-section. The second through hole 73 has a female threaded part 731 on at least a part of the inner peripheral surface thereof. The second through hole 73 penetrates through the slide member body 71. The first through hole 72 and the outside of the slide member body 71 communicate through the second through hole 73, it should be noted that the second through hole 73 extends in a direction substantially perpendicular to the extending direction of the first through hole 72.

As illustrated in FIGS. 3 and 5, the accommodation recess 74 is formed on the inner peripheral surface of the first through hole 72. When described in detail, the accommodation recess 74 is formed on the middle part of the first through hole 72 in the extending direction of the first through hole 72. The inner diameter of the accommodation recess 74 is greater than that of the first through hole 72. The depth (d) of the accommodation recess 74 is preferably roughly in a range of greater than or equal to 0.5 mm and less than or equal to 1.2 mm, although not particularly limited to a specific magnitude. It should be noted that the depth d of the accommodation recess 74 refers to the distance between the inner peripheral surface of the accommodation recess 74 and the inner peripheral surface of the first through hole 72. Further, the width (w) of the accommodation recess 74 is preferably set to be roughly in a range of greater than or equal to 40% of the axial length (L) of the first through hole 72 and less than or equal to 70% of the axial length (L) of the first through hole 72, although not particularly limited to a specific magnitude.

The accommodation recess 74 extends in the circumferential direction of the inner peripheral surface of the first through hole 72. Further, the accommodation recess 74 communicates with the second through hole 73. As illustrated in FIG. 3, the accommodation recess 74 extends in opposition to the guide member body 61 and the opening 62.

As illustrated in FIG. 4, the slide member 7 has a fishing line guide part (not shown) for guiding the fishing line. The fishing line extends from the spool 4 in a forward direction through the fishing line guide part. It should be noted that the fishing line guide part is a member made of hard material (e.g., ceramics) and is fitted to a hole 75 penetrating through the slide member body 71. The fishing line guide part has a through hole bored in the same direction as the hole 75.

When sliding along the guide member 6, the slide member 7 slightly tilts by three applied to the fishing line guide part from the fishing line and force applied to the engaging member 8 from the worm shaft 5. Further, when the slide member 7 is moved to the left in FIG. 3, for instance, a left end part 721 of the inner peripheral surface of the first through hole 72 separates away from the upper surface of the guide member 6 whereas a right end part 722 of the inner peripheral surface of the first through hole 72 makes contact with the upper surface of the guide member 6. In other words, a foreign object (e.g., mud) attaching to the upper surface of the guide member 6 is scraped away therefrom by the right end part 722 of the first through hole 72 and is then trapped within the accommodation recess 74. It should be noted that the guide member 6 has the opening 62 bored in the lower surface thereof. Thus, the inner peripheral surface of the first through hole 72 does not make contact with the lower surface of the guide member 6.

As illustrated in FIG. 3, the engaging member 8 is structured to be engaged with the worm shaft 5. When described in detail, the engaging member 8 is structured to be engaged with the helical groove 51 of the worm shaft 5. The engaging member 8 extends from the outside of the guide member 6 to the inside of the guide member 6 through the opening 62. The engaging member 8 has a shaft part 81 and an engaging pawl part 82. The shaft part 81 has a substantially columnar shape. The engaging pawl part 82 is structured to be engaged with the helical groove 51. The shaft part 81 and the engaging pawl part 82 are integrally formed.

The lid member 9 has a lid body 91 and a retaining part 92. The lid body 91 is structured to cover an end of the second through hole 73. The retaining part 92 has a cylindrical shape and extends from the lid body 91. The retaining part 92 is accommodated in the second through hole 73. Further, the retaining part 92 is disposed between the inner peripheral surface of the second through hole 73 and the outer peripheral surface of the engaging member 8. When described in detail, the retaining part 92 is disposed between the inner peripheral surface of the second through hole 73 and the outer peripheral surface of the shaft part 81. The retaining part 92 retains the engaging member 8 so as to enable the engaging member 8 to slide and rotate along the retaining part 92. The retaining part 92 is partially accommodated in the opening 62.

The shaft part 81 of the engaging member 8 is accommodated in the retaining part 92. The inner diameter of the retaining part 92 is designed to be roughly equal to the outer diameter of the shaft part 81 of the engaging member 8. When described in detail, the shaft part 81 of the engaging member 8 has an outer diameter less than the inner diameter of the retaining part 92 so as to be rotatable about the axis within the retaining part 92.

The retaining part 92 has a male threaded part 921 on at least a part of the outer peripheral surface thereof. The male threaded part 921 is screwed into the female threaded part 731 formed on the inner peripheral surface of the second through hole 73. In other words, the retaining part 92 is fixed to the slide member 7 and retains the engaging member 8. As is clear from FIG. 3, the outer surface of the lid member 9 smoothly continues to that of the slide member 7.

Next, explanation will be made for an action of the level winding mechanism 50 structured as described above.

First, when the handle 2 is rotated, the worm shaft 5 is rotated through the drive shaft 31, the first gear 34 and the second gear 35. The engaging member 8 is reciprocated along the worm shaft 5 by the rotation of the worm shaft 5. The engaging member 8 is retained by the lid member 9, and the lid member 9 is fixed to the slide member 7. Thus, the slide member 7 is reciprocated along the worm shaft 5 together with the engaging member 8. As a result, the fishing line is evenly wound about the spool 4, while being guided by the fishing line guide part of the slide member 7.

<Features>

The level winding mechanism 50 according to the present exemplary embodiment has the following features.

The level winding mechanism 50 of the dual-bearing reel 100 includes the worm shaft 5, the guide member 6 and the slide member 7. The guide member 6 has a tubular shape and is disposed radially outside of the worm shaft 5. The slide member 7 has the first through hole 72 and the accommodation recess 74. The guide member 6 penetrates through the first through hole 72. The accommodation recess 74 is formed on the inner surface of the first through hole 72. The slide member 7 slides along the guide member 6.

According to this structure, even when a foreign object (e.g., mud) enters the first through hole 72 through the clearance produced between the guide member 6 and the first through hole 72 of the slide member 7, the foreign object is trapped within the accommodation recess 74 formed on the inner surface of the first through hole 72. Therefore, even when a foreign object enters the first through hole 72, the slide member 7 can be smoothly reciprocated along the guide member 6.

<Modifications>

One exemplary embodiment of the present invention has been described above. However, the present invention is not limited to the aforementioned exemplary embodiment, and a variety of changes can be made without departing from the scope of the present invention.

Modification 1

In the aforementioned exemplary embodiment, the engaging member 8 is retained by the retaining part 92 of the lid member 9. However, the structure of the engaging part 8 is not particularly limited to the above. For example, the engaging member 8 may be retained by the second through hole 73 of the slide member 7. In the structure, the lid member 9 does not have the retaining part 92.

Modification 2

In the aforementioned exemplary embodiment, the accommodation recess 74 is formed on the inner surface of the first through hole 72 entirely in the circumferential direction. However, the structure of the accommodation recess 74 is not particularly limited to the above. For example, the accommodation recess 74 may be formed on the inner peripheral surface of the first through hole 72 only partially in the circumferential direction.

Modification 3

In the aforementioned exemplary embodiment, only a single row of the accommodation recess 74 is formed. However, the number of rows of the accommodation recesses 74 is not particularly limited to the above. For example, a plurality of rows of the accommodation recesses 74 may be formed.

Modification 4

In the aforementioned exemplary embodiment, a foreign object is discharged from the accommodation recess 74 through the opening 62 of the guide member 6. However, the structure for discharging a foreign object is not particularly limited to the above. For example, a discharge port, through which the accommodation recess 74 communicates with the outer surface of the slide member 7, may be further formed for discharging a foreign object and/or so forth therethrough.

What is claimed is:

1. A level winding mechanism for a dual-bearing reel, comprising:
    a worm shaft;
    a guide member having a tubular shape and being disposed radially outside of the worm shaft; and
    a slide member configured to have a fishing line extend therethrough and slide along the guide member so as to guide the fishing line, and having a first through hole and an accommodation recess, the guide member passing through the first through hole, the accommodation recess being formed on an inner surface of the first through hole.

2. The level winding mechanism for the dual-bearing reel according to claim 1, wherein
    the guide member includes
    a guide member body having a tubular shape, and
    an opening bored in the guide member body and extending in a longitudinal direction of the guide member body.

3. The level winding mechanism for the dual-bearing reel according to claim 2, wherein
    the accommodation recess is opposed to the guide member body and the opening.

4. The level winding mechanism for the dual-bearing reel according to claim 3, wherein
    the accommodation recess extends in a circumferential direction along an inner surface of the first through hole.

5. The level winding mechanism for the dual-bearing reel according to claim 3, further comprising:
    an engaging member engaged with the worm shaft,
    the slide member having a second through hole for accommodating the engaging member.

6. The level winding mechanism for the dual-bearing reel according to claim 2, wherein
    the opening is oriented downwardly in the dual-bearing reel.

7. The level winding mechanism for the dual-bearing reel according to claim 6, wherein
    the accommodation recess extends a circumferential direction along an inner surface of the first through hole.

8. The level winding mechanism for the dual-bearing reel according to claim 6, further comprising:
    an engaging member engaged with the worm shaft,
    the slide member having a second through hole for accommodating the engaging member.

9. The level winding mechanism for the dual-bearing reel according to claim 2, further comprising:
    an engaging member engaged with the worm shaft,
    the slide member having a second through hole for accommodating the engaging member.

10. The level winding mechanism for the dual-bearing reel according to claim 9, wherein
    the engaging member is engaged with the worm shaft through the opening.

11. The level winding mechanism for a dual-bearing reel according to claim 10, wherein
    the accommodation recess extends in the circumferential direction of the inner surface of the first through hole, and
    the accommodation recess communicates with the second through hole.

12. The level winding mechanism for the dual-bearing reel according to claim 2, wherein
    the accommodation recess extends in a circumferential direction along an inner surface of the first through hole.

13. The level winding mechanism for the dual-bearing reel according to claim 1, wherein
    the accommodation recess extends in a circumferential direction along an inner surface of the first through hole.

14. The level winding mechanism for the dual-bearing reel according to claim 13, further comprising:
    an engaging member engaged with the worm shaft,
    the slide member having a second through hole for accommodating the engaging member.

15. The level winding mechanism for the dual-bearing reel according to claim 1, further comprising:
    an engaging member engaged with the worm shaft, the slide member having a second through hole for accommodating the engaging member.

16. The level winding mechanism for a dual-bearing reel according to claim 15, wherein
the accommodation recess extends in the circumferential direction of the inner surface of the first through hole, and
the accommodation recess communicates with the second through hole.

* * * * *